United States Patent [19]

Bilhorn

[11] 3,880,669

[45] Apr. 29, 1975

[54] PROCESS FOR MAKING AN ELECTRODE BEARING PLASTIC STRIP

[75] Inventor: John M. Bilhorn, Edgerton, Wis.

[73] Assignee: ESB Incorporated, Philadelphia, Pa.

[22] Filed: Apr. 22, 1974

[21] Appl. No.: 462,964

[52] U.S. Cl................................ 136/10; 136/120 R
[51] Int. Cl. .......................................... H01m 39/06
[58] Field of Search.......... 136/120 R, 120 FC, 111, 136/10, 121–122, 35, 66, 46, 70, 75–76

[56] References Cited
UNITED STATES PATENTS

| | | | |
|---|---|---|---|
| 3,770,505 | 11/1973 | Bergum et al. ....................... | 136/10 |
| 3,770,509 | 11/1973 | Winsel et al. .................. | 136/120 FC |
| 3,778,311 | 12/1973 | Metzger et al. ................ | 136/120 FC |

*Primary Examiner*—Anthony Skapars

[57] ABSTRACT

A method for making an electrode bearing conductive material by preparing a solvent containing electronically conductive plastic strip and contacting it with a solvent containing electrode mix such that an intimate electronic contact is effected between the contacting surfaces of the plastic strip and the electrode mix.

6 Claims, 2 Drawing Figures

PROCESS FOR MAKING AN ELECTRODE BEARING PLASTIC STRIP

BACKGROUND OF THE INVENTION

1. Field of the Invention

This invention relates to a method for making an electronically conductive plastic strip bearing on its surface an electrode mix in intimate electrical contact therewith. The combination of electrically conductive plastic strip and electrode mix is made by preparing a solvent containing plastic strip and intimately contacting it with a solvent containing electrode mix wherein each of the two solvents, i.e. the solvent of the plastic strip and the solvent of the electrode mix are likewise solvents for the other of the plastic strip or electrode mix, such that a physical-chemical interaction is set up at the contact surface between the electrode mix and the plastic strip and such that the two are intimately electronically contacted one with the other.

2. Description of the Prior Art

The problem of establishing and maintaining good electronic contact in an electrochemical cell always has been a major consideration in basic cell design. The internal resistance of the cell, as well as of a series of cells, reduces the effective closed circuit voltage. This reduction is proportionate to the current so that, in cells and batteries designed with high surface area electrodes for high rate capabilities, the problem is compounded. It is to be noted that both electronic and ionic contacts exist in an electrochemical cell. Ionic contact exists between the anode and the cathode, whereas electronic contact exists between the anode and a cell or battery terminal and between the cathode and a cell or battery terminal. The electronic contact may also be established through a closure member or container or a seal or through a vent arrangement.

Frequently in multicell flat batteries a duplex electrode is employed (U.S. Pat. Nos. 3,770,504 and 3,770,505). Such duplex electrodes comprise an electronically conductive plastic strip called a carrier strip or intercell connector which is contacted on one side with an anode and the other side with a cathode. The contact between cathode and plastic strip or between anode and plastic strip has normally been established by mechanical pressure maintaining the surface of the cathode and/or anode in close proximity to the intercell connector. The use of a steel case with a seam, such as a mennen seam has accomplished this. The use of a relatively strong metal band which is wrapped around the cell stack, and welded to maintain the mechanical pressure, is another method used to accomplish this. However, when means for maintaining contact by mechanical pressure are not available because of size limitation or application, other means need be supplied. Another method of maintaining contact between the anode and cathode and the plastic strip consists of applying intermittent deposits of positive and negative electrodes on the carrier strip and maintaining them in place by means of the binder of the electrode adhering to the surface of the strip.

A novel method has now been discovered for maintaining electrical contact of the cathode and/or anode with the plastic strip intercell connector.

SUMMARY OF THE INVENTION

This invention is directed to a method for making an electrode bearing, electronically conductive, ionically nonconductive material by:

a. preparing a solution comprising electronically conductive plastic resin and a solvent therefor;

b. casting said solution into an electronically conductive solvent containing plastic strip;

c. preparing an electrode mix comprising electronically conductive plastic resin, a solvent therefor, and electrode material;

d. physically contacting said plastic strip with said electrode mix, wherein the solvent in each of the plastic strip and the electrode mix is a solvent for the plastic resin of both the plastic strip and the electrode mix thus effecting both a physical-chemical interaction and an intimate electronic contact between the surfaces of the plastic strip and the electrode mix as a result of the mutual solvency of the plastic resins in said surfaces; and e. removing substantially all solvent therefrom.

DESCRIPTION OF THE INVENTION

Figure 1:
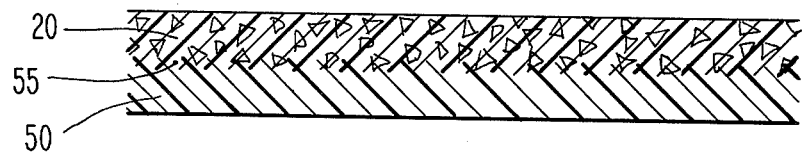
FIG. 1 is a schematic diagram showing a cross section of an electrode bearing conducting material prepared according to this invention.

One technique for constructing multicell batteries is with the use of duplex electrodes, also known as bipolar electrodes. A duplex electrode is a separately constructed assembly in which an electrolyte impervious, electrochemically non-reactive member which eventually divides one cell from an adjacent cell has a positive electrode on one side and a negative electrode on the other side. After being so constructed, the duplex electrode is subsequently assembled into a multicell battery. The electrolyte impervious, electrochemically non-reactive member is frequently a conductive plastic carrier strip or intercell connector.

Intercell connectors in a flat cell are required to perform at least three functions:

1. they must be sufficiently conductive electronically;

2. they must be impervious to liquid electrolyte flow so as to effectively seal one cell from the next; and 3. they must electrochemically be compatible with the cell system, i.e. they must not set up an opposing electrochemical couple within each cell which would effectively reduce the voltage. Conductive plastic sheeting has been developed which performs these three functions such as various vinyl resins which are loaded with conductive carbon. The carbon is generally in the form of a carbon black to give a carbon-to-carbon chain structure. In order to make such plastic sheeting sufficiently conductive it has been found that merely loading it with conductive blacks to the highest handleable content may not be sufficient. The processing must be such as to not break the carbon chains. For this reason extrusion or other processes which work the material may not be most advantageous for the preparation of highly conductive materials. Casting, however, from a solvent solution does maintain the carbon chains and high transverse conductivity can be obtained when the carbon chains are not only unbroken but oriented transversely.

As used herein the term plastic strip shall mean plastic carrier strip or intercell connector. In accordance with this invention the electrically conductive ionically non-conductive plastic strip comprises a plastic material and a suitable solvent and may be produced by casting or other suitable techniques. The conductive plastic strip may be made, for example, from materials such as polymers loaded with electrically conductive particles and containing various stabilizers and/or plasticizers. The conductive particles may be carbonaceous materials such as graphite or acetylene black, or metallic particles may also be used. Polymers which by themselves are sufficiently conductive may also be used. The conductive plastic strip, whether loaded or unloaded, must be made from a composition which is compatible with other components of the battery. For batteries using LeClanche and moderately concentrated alkaline electrolytes, the conductive plastic strip may be made for example, from resins such as polyacrylates, polyvinyl halides, polyvinylidene halides, polyacrylonitriles, copolymers of vinyl chloride and vinylidene chloride, polychloroprene, and butadiene-styrene or butadiene-acrylonitrile resins. For batteries using strongly alkaline electrolytes, polyvinylchloride and polyolefins such as polyethylene and polyisobutylene may be used in the preparation of the conductive plastic. For batteries using acid electrolytes such as sulfuric acid, polyvinyl halides, copolymers of vinyl chloride, and vinylidene chloride may be used.

In one embodiment of this invention, in forming the plastic strip, the selected plastic resin is mixed with a suitable solvent medium of at least limited solubility and mixed to form a solution hereinafter called "solvent solution." The resulting solution, i.e. the plastic strip precursor, may then be cast into a solvent containing plastic strip or membrane by various procedures, such for example, as by means of reverse roll coating, doctor blade, spraying or dip coating. Another solvent solution is also prepared in the same manner as described above with respect to the plastic strip precursor except that there is added to the solution an electrode material, e.g. cathodic material, e.g. in a LeClanche cell system the cathodic material would be a mixture of manganese dioxide and carbon. This electrode containing solvent solution shall hereinafter be called the electrode mix.

Useful solvents for the preparation of both the plastic strip and the electrode mix would include low molecular weight organic solvents such as acetone, methyl ethyl ketone, methyl isobutyl ketone, tetrahydrofurane, ethyl ether, ethyl alcohol, chloral, chloroform, cyclopentane, heptane, hexane, dioxane. Generally the solvent can be chosen solely on the basis of its solvent power for the resin(s) selected but economics and solvent recovery may also influence solvent selection.

The solvent used in the preparation of the plastic strip may be the same or different from the solvent used in the preparation of the electrode mix, however, both solvents must necessarily be solvents for both the plastic resin of the plastic strip and the plastic resin of the electrode mix. Likewise, the plastic resin material utilized in the preparation of the plastic strip may be the same as or different from the plastic resin material utilized in the preparation of the electrode mix, however, both plastic resins must be electronically conductive.

The electrode mix is then physically contacted with the solvent containing plastic strip thus effecting the physical chemical interaction and an intimate electronic contact between the surfaces of the plastic strip and the electrode mix. This physical-chemical interaction and intimate electronic contact is a result of a mutual solvency of the surfaces of both the plastic strip and the electrode mix, i.e. the plastic resin of each of the plastic strip and the electrode mix are at least to some extent soluble in the solvent of the other. As a result, surface particles of the plastic strip will impregnate the surface of the electrode mix while at the same time surface particles of the electrode mix will impregnate the surface of the plastic strip and the two surfaces wll then be bonded together so that intimate electronic contact is achieved between the two, and no definite boundary will exist between the two.

Since the plastic resins of both the plastic strip and the electrode mix are electronically conductive, the resultant combination of the plastic strip and the electrode mix will be in intimate contact both physically and electronically producing an intimately bonded product. Since, however, the contact of the plastic strip and the electrode mix will be only surface contact, the ionically conductive particles of the electrode mix will not permeate the entire plastic strip but rather merely the surface of the plastic strip and thus the resultant product will be ionically non-conductive and will resemble that set forth in FIG. 1. In FIG. 1, 20 is the cathode electrode mix, 50 is the plastic strip and 55 is the intimate surface contact area of electrode mix with plastic strip.

The preferred way of contacting the plastic strip with the electrode mix is to cast the electrode mix from the electrode containing solvent solution onto the surface of the plastic strip and subsequently removing substantially all solvent therefrom. The solvent may be removed by any means known in the art such as evaporation.

Figure 2:
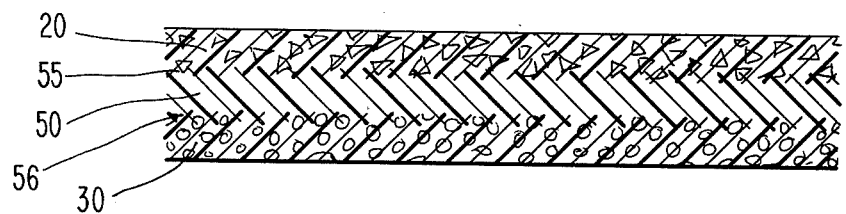
FIG. 2 is a schematic diagram of a cross section of another electrode bearing conductive material prepared according to this invention.

If the electrode mix cast on the surface of the plastic strip is a cathode mix it would also be possible to apply to the opposite side of the plastic strip the battery anode which could be prepared in the same manner as discussed above with respect to electrode mix utilizing an anode material in said mix rather than a cathode mix. The anode could likewise be applied by casting as described above with respect to the cathode (see FIG. 2). In FIG. 2, 30 is the anode electrode mix and 56 is the intimate surface contact area of electrode mix with plastic strip.

The product produced by the process may then be assembled into a battery, e.g. a multicell flat battery, wherein it eliminates the necessity for the maintenance of mechanical pressure to insure electrical contact of the cathode and/or anode with the intercell connector of duplex electrodes normally found in multicell flat batteries.

The foregoing detailed description has been given for clarity of understanding only and no unnecessary limitations are to be understood therefrom. The invention is not limited to the exact details shown and described for obvious modification will occur to one skilled in the art.

The embodiments of the invention in which an exclusive property or privilege is claimed are defined as follows:

1. A method for making an electrode bearing, electronically conductive, ionically non-conductive material, which method comprises:
   a. preparing a solution comprising electronically conductive plastic resin and a solvent therefor;
   b. casting said solution into an electronically conductive solvent containing plastic strip;
   c. preparing an electrode mix comprising electronically conductive plastic resin, a solvent therefor, and electrode material;
   d. physically contacting said plastic strip with said electrode mix, wherein the solvent in each of the plastic strip and the electrode mix is a solvent for the plastic resin of both the plastic strip and the electrode mix thus effecting both a physical-chemical interaction and an intimate electronic contact between the surfaces of the plastic strip and the electrode mix as a result of the mutual solvency of the plastic resins in said surfaces; and
   e. removing substantially all solvent therefrom.

2. A method according to claim 1 wherein one side of the plastic strip is contacted with the electrode mix.

3. A method for making an electrode bearing, electronically conductive, ionically non-conductive material, which method comprises:
   a. preparing a solution comprising electronically conductive plastic resin and a solvent therefor;
   b. casting said solution into an electronically conductive solvent containing plastic strip;
   c. preparing an anode electrode mix comprising electronically conductive plastic resin, a solvent therefor, an anode electrode material;
   d. preparing a cathode electrode mix comprising electronically conductive plastic resin, a solvent therefor, and cathode electrode material;
   e. physically contacting one side of said plastic strip with said anode electrode mix;
   f. physically contacting the other side of said plastic strip with said cathode electrode mix. wherein the solvent in each of the plastic strip, the anode electrode mix and the cathode electrode mix is a solvent for the plastic resin of each of the plastic strip, the anode electrode mix and the cathode electrode mix thus effecting both a physical-chemical interaction and an intimate electronic contact between the surfaces of the plastic strip and both of the electrode mixes as a result of the mutual solvency of the plastic resins in said surfaces; and
   g. removing substantially all solvent therefrom.

4. A method for making a battery having an electrode bearing, electronically conductive, ionically non-conductive material therein, which method comprises:
   a. preparing a solution comprising electronically conductive plastic resin and a solvent therefor;
   b. casting said solution into an electronically conductive solvent containing plastic strip;
   c. preparing an electrode mix comprising electronically conductive plastic resin, a solvent therefor, and electrode material;
   d. physically contacting said plastic strip with said electrode mix, wherein the solvent in each of the plastic strip and the elecrode mix is a solvent for the plastic resin of both the plastic strip and the electrode mix thus effecting both a physical-chemical interaction and an intimate electronic contact between the surfaces of the plastic strip and the electrode mix as a result of the mutual solvency of the plastic resins in said surfaces;
   e. removing substantially all solvent therefrom; and
   f. assembling the resultant electrode bearing electronically conductive, ionically non-conductive material into a battery.

5. A method according to claim 4 wherein one side of the plastic strip is contacted with the electrode mix.

6. A method for making a battery having an electrode bearing, electronically conductive, ionically non-conductive material therein, which method comprises:
   a. preparing a solution comprising electronically conductive plastic resin and a solvent therefor;
   b. casting said solution into an electronically conductive solvent containing plastic strip;
   c. preparing an anode electrode mix comprising electronically conductive plastic resin, a solvent therefor, an anode electrode material;
   d. preparing a cathode electrode mix comprising electronically conductive plastic resin, a solvent therefor, and cathode electrode material;
   e. physically contacting one side of said plastic strip with said anode electrode mix;
   f. physically contacting the other side of said plastic strip with said cathode electrode mix, wherein the solvent in each of the plastic strip, the anode electrode mix and the cathode electrode mix is a solvent for the plastic resin of each of the plastic strip, the anode electrode mix and the cathode electrode mix thus effecting both a physical-chemical interaction and an intimate electronic contact between the surfaces of the plastic strip and both of the electrode mixes as a reslult of the mutual solvency of the plastic resins in said surfaces;
   g. removing substantially all solvent therefrom;
   h. and assembling the resultant material into a battery.

* * * * *